United States Patent Office 3,203,935
Patented Aug. 31, 1965

3,203,935
POLYMERIC COMPOSITIONS OF TERPOLYMERS REACTED WITH AMINOHYDROXY COMPOUNDS
Thomas J. Miranda, Granger, Herbert R. Herman and Thomas F. Marcotte, South Bend, Ind., assignors to The O'Brien Corporation, South Bend, Ind., a corporation of Indiana
No Drawing. Filed May 7, 1962, Ser. No. 192,982
14 Claims. (Cl. 260—78.5)

This invention is related to copolymers suitable for the preparation of coating compositions. More specifically, it is related to copolymers of vinyl aryl hydrocarbons, such as styrene, unsaturated esters, such as 2-ethylhexyl acrylate, and unsaturated acids, such as acrylic acid, with or without additional comonomers, which copolymers are subsequently reacted with particular amine compounds and thereby adapted to postcuring.

Resins containing a substantial proportion of styrene therein are generally brittle and therefore cannot be used in protective coatings where such coatings are to undergo post-forming operations, such as in the manufacture of cans, house-siding, metal furniture, etc. In such compositions, there is also a need for resistance to water and detergents. Such resistance is also needed in polymeric compositions used as finishes or coating compositions in the manufacture of appliances, such as refrigerators, washing machines, etc. Such uses require a polymer having flexibility incorporated in the polymer chain or having post-flexibilizing properties incorporated by selection of an appropriate curing agent. Moreover, one of the serious objections to thermosetting acrylic resins has been the difficulty encountered in obtaining good grease and stain resistance.

In accordance with the present invention it has now been found that the above-mentioned desirable properties can be incorporated in resins having substantial proportions of styrene, etc. therein by the preparation of copolymers having 20–85% preferably 25–75% of styrene, 10–75% preferably 15–60%, of an acrylate or methacrylate ester having 4–10 carbon atoms in the ester group thereof, or of a dialkyl maleate, fumarate, itaconate or tetrahydrophthalate having no more than 10 carbon atoms in each alkyl group, and 1–15%, preferably 5–10% of an unsaturated acid, such as acrylic, methacrylic, maleic, fumaric, itaconic and tetrahydrophthalic acids, and thereafter reacting such copolymers with a compound having one amino group and 1–3, preferably 2–3, hydroxy groups therein, which hydroxy group or groups are each at least two carbon atoms removed from the amino group. The resultant polymeric amides are found to have the desired flexibility and other desirable properties described above, particularly resistance to grease and stains.

The amino hydroxy compounds found suitable for the practice of this invention are those having at least one hydrogen atom on the amino group and at least two carbon atoms between the amino group and each hydroxy group therein. When the hydroxy group and the amino group are on the same carbon atoms, the compositions do not have the desired stability. Advantageously, the amine-hydroxy compound has no more than ten carbon atoms therein since the bulk of larger radicals detract from the desired properties of the product. Preferred compounds of this type are those having a primary amino group, that is, having two hydrogen atoms on the nitrogen.

Particularly desirable are amino-hydroxy compounds having a plurality of hydroxy groups therein which increase the adaptability for post reaction. For this purpose, amino-trimethylolmethane is particularly desirable. Also preferred are 2-amino-1,2-dimethylol-propane; 2-amino-1,3-propanediol; 2-amino-1,4-butanediol; amino-diethylol-methane; 1-amino-3,4-butanediol; 3-amino-2,4,5-trihydroxy-hexane; 1-amino-2,2,2-trimethylol-ethane; etc. Also suitable are 2-amino-propanol-1; 3-amino-propanol-1; 3-amino-butanol-1; 2-methylamino-propanol-1; 4-methylamino - butanol - 1; 3 - ethylamino-butanediol-1,4; ortho - methylolaniline; 1-amino-2-methylol-cyclohexane, 3-amino-cyclohexanol, etc.

Particularly preferred as an unsaturated ester for the practice of this invention is 2-ethyl-hexyl acrylate. However, various other acrylates and methacrylates are found to impart suitable plasticity and other desired properties, when there are 4–10 carbon atoms in the ester group. Also suitable are dialkyl esters of maleic, fumaric, itaconic and tetrahydrophthalic acids. Typical suitable compounds include butyl acrylate, amyl acrylate, amyl methacrylate, hexyl acrylate, heptyl acrylate, octyl methacrylate, octyl acrylate, nonyl acrylate, decyl acrylate, etc. In addition to the types listed above, the ester group can consist of a substituted alkyl group, such as ethoxyethyl, ethoxybutyl, butoxybutyl, etc., provided there are at least the stated number of carbon atoms in the ester groups. However, when the acid from which the unsaturated ester is one which is difunctional, such as maleic, fumaric, itaconic and tetrahydrophthalic acids, the greater number of atoms in the acid portion of the compound supplies sufficient plasticity and there can be as little as one carbon atom in the ester groups of such compounds. For example, dimethyl maleate, dimethyl itaconate, diethyl maleate, dipropyl fumarate, dibutyl maleate, diamyl itaconate, dimethyl tetrahydrophthalate, dibutyl tetrahydrophthalate, etc., are satisfactory.

In addition to styrene which is preferred for the practice of this invention, other vinyl aryl hydrocarbons can be used, such as vinyl naphthalene, vinyl diphenyl, and various derivatives of styrene, vinyl naphthalene and vinyl diphenyl which have various hydrocarbon groups such as alkyl, aryl and cycloalkyl, substituted on the aromatic nuclei, such as methyl styrene, dimethyl styrene, ethyl styrene, vinyl methyl naphthalene, vinyl ethyl napthalene, vinyl butyl naphthalene, vinyl amyl diphenyl vinyl methyl diphenyl, cyclohexyl styrene, vinyl cyclohexyl naphthalene, vinyl cyclopentyl naphthalene, vinyl cyclohexyl diphenyl, etc. Derivatives having a small number of carbon atoms in the substituent groups are preferred and it is generally undesirable to have more than a total of 8 carbon atoms in such substituent groups. The vinyl aryl hydrocarbons can be represented by the formula $$CH_2=CH-Ar$$

and the repeating unit structures derived therefrom can be represented by

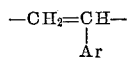

wherein Ar represents an aromatic hydrocarbon nuclei and hydrocarbon derivatives, such as illustrated above.

The various unsaturated esters that can be used in the practice of this invention, such as illustrated above, can be represented by the following formulas:

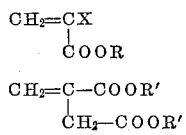

and

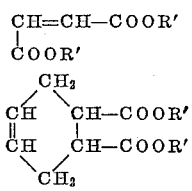

wherein X is hydrogen or methyl; R is an alkyl group of 4–10 carbon atoms; R' is an alkyl group of 1–10 carbon atoms.

When these are copolymerized as describe dherein, the repeating units in the polymer molecules resulting therefrom have the following formulas respectively:

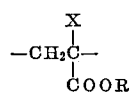 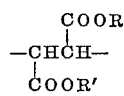 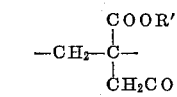

and

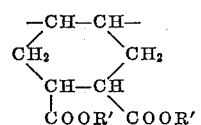

The various unsaturated acids that can be used, as described above, are represented by the following formulas:

 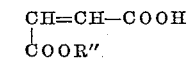

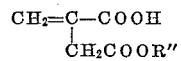 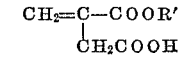

and

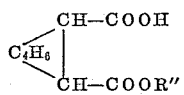

wherein X and R' are as defined above and R'' is hydrogen or an alkyl group of 1–10 carbon atoms.

The corresponding repeating units present in the resultant copolymers have the following formulas respectively:

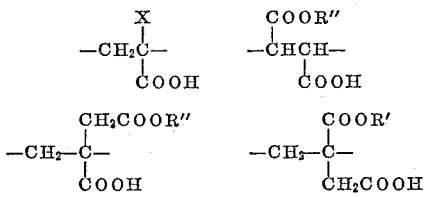

and

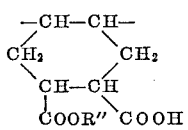

The amine-hydroxy compounds suitable for the practice of this invention are represented by the formula:

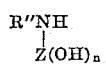

wherein R'' is as defined above (hydrogen or alkyl group of 1–10 carbon atoms) in this case preferably hydrogen; Z is polyvalent aliphatic, cycloaliphatic or aromatic hydrocarbon radical having no more than 10 carbon atoms therein, a valency of $n$ plus 1, and having at least 2 carbon atoms between each OH group and the N of said formula, and $n$ is an integer having a value of 1–3, preferably 2 or 3. Preferred compounds of this type have the formula:

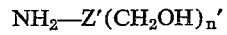

wherein Z' is an aliphatic hydrocarbon group of no more than 4 carbon atoms and $n'$ has a value of 2 or 3.

When the unsaturated acid copolymers are reacted with these amine-hydroxy compounds, the resultant copolymers have repeating units therein of the formulas:

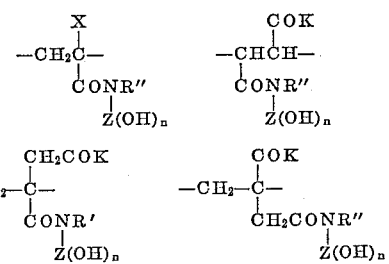

and

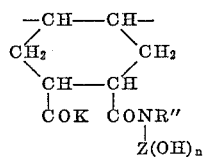

Wherein R'', Z, and $n$ are as defined above, K, is —OR' or

When the preferred amine-hydroxy compounds of the formula $NH_2-Z'(CH_2OH)_{n'}$ are used the repeating unit formulas will be as represented immediately above except that

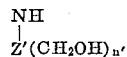

will be substituted for

in each case.

While other methods can be used for determining the progress of the amidification reaction, this can be easily determined by running the reaction in such a manner that the water of condensation is refluxed and collected, for example, by using toulene to form an azeotrope. When approximately the theoretical amount of water is collected as would be formed by the formation of the amide in accordance with the amounts of materials used, this indicates that the reagents have been substantially completely converted to the amide.

The invention is best illustrated by the following examples, which are given merely for illustrative purposes. It is not intended that these examples in any way limit the scope of the invention or the manner in which the invention can be practiced. Unless specifically indicated otherwise, reference to parts or percentages are by weight.

*Example 1*

Into a resin kettle equipped with stirrer, nitrogen inlet, reflux condenser, thermometer and a device for dropwise addition of liquid, there is added 250 parts of Cellosolve (ethoxyethyl) acetate. The atmosphere in the kettle is swept out with nitrogen and a blanket of nitrogen maintained during the heating and subsequent reaction. The temperature of the liquid is raised to 130° C. and then a monomeric mixture is added dropwise over a two hour period, during which the temperature rises to 148° C. This monomeric mixture consists of:

| | Parts |
|---|---|
| Styrene | 70 |
| 2-ethyl hexyl acrylate | 140 |
| Glacial acrylic acid | 30 |
| Ditertiary butyl peroxide | 2 |

Upon completion of the addition of the monomeric mixture, the temperature is maintained for an additional two hours, after which time the conversion to polymer is over 99% and the acid number of the product is 123.2.

The reaction vessel is then cooled to 100° C. and fitted with a trap for collecting reflux. Approximately 50 parts of toluene and 50 parts of amino tris(hydroxymethyl)-methane (trisamino) are added and the reaction vessel heated to 140° C. until 10.5 parts of water are collected in the reflux trap. At this time the acid number is found to be reduced to 63.7. The vessel is cooled and the slightly hazy product is filtered through cheesecloth. The resultant resin product is found to have 46% solids, a weight per gallon of 8.53 pounds, and a Gardner viscosity of W.

Using thirty parts of this resin, a paint is prepared by the addition of 40 parts xylene, 30 parts $TiO_2$ pigment and 20 parts of a 50% solution melamine-formaldehyde resin in butanol having a Gardner viscosity of L, a specific gravity of 0.97 and acid number of 1. Bonderized steel panels are sprayed with this paint composition, flashed and baked for thirty minutes at 300° F. The finished panel has the following properties: direct impact strength of 28 inch pounds; reverse impact of 10 inch pounds; a pencil hardness of F; good grease resistance; good stain resistance; excellent recoatability; excellent overbake and excellent detergent resistance.

*Example II*

The procedure of Example I is repeated using 43.7 parts of 2-amino-2-methyl-1,3-propanediol in the place of the trisamino. When 10.5 parts of water has been removed during the reaction, the resin product has the following properties: a solids content of 49.5%, a Gardner viscosity of U, a weight per gallon of 8.52 pounds and an acid number of 67.5. The paint prepared from this resin has good adhesion, good chemical and stain resistance, and excellent recoatability.

*Example III*

An automotive finish is prepared from 49.4 parts of the resin prepared in Example I using also 21.4 parts finely divided titanium dioxide, 13.2 parts of melamine resin, 6.35 parts high boiling aromatic solvent, 1.4 parts xylol and 5.2 parts high flash naphtha. The melamine resin which is added consists of two melamine-formaldehyde resins. 6.9 parts of the first resin is added as a 60% solution in equal parts of butanol and xylene, and has an acid number of less than 1, a Gardner viscosity of M, color of less than 50 (APHA) and specific gravity of 1.035. 6.2 parts of the second melamine resin are added as a 50% solution in 40% butanol and 10% xylene, having an acid number less than 1, a Gardner viscosity of G, clear color, and a specific gravity of 0.97. The resultant composition is applied to sheet metal and cured at 250° F. for 45 minutes. The finished enamel has the following properties: no creepage on the salt fog test; good resistance to abrasion by gravel; passes the 28 inch pounds direct impact test; has excellent gloss retention, good alkali resistance, good detergent resistance, and a Sward rocker hardness test of 51.

*Example IV*

A baking enamel is prepared using 70 parts of the resin prepared in Example II, 30 parts of hexa-(methoxymethyl)melamine and 100 parts of aromatic solvent having a boiling range of 185–208° C. A coating of this composition is applied to a metal surface and then baked at 300° F. for thirty minutes without any additional catalyst. The acidity of this resin serves to catalyze this melamine derivative, which otherwise requires a catalyst. The resultant coating is a hard, glossy film with good chemical resistance.

*Example V*

The procedure of Example I is repeated using 50 parts styrene, 40 parts 2-ethylhexyl acrylate and 10 parts glacial acrylic acid, with 15.1 parts of amino-tri-(hydroxymethyl)-methane being subsequently reacted. Similar results are obtained.

*Example VI*

Satisfactory results are also obtained when the procedure of Example V is repeated a number of times replacing the amino-tri(hydroxymethyl)-methane with an equivalent amount of 2-amino-1-butanol, 2 - amino-2-methyl-1,3-propanediol, and 2-amino-2-ethyl - 1,3 - propanediol, respectively, and likewise when the acrylic acid and the amino-tri(hydroxymethyl)-methane are replaced with equivalent amounts of maleic anhydride and o-(hydroxymethyl)-aniline, respectively.

*Example VII*

Into the equipment of Example I, there is charged 350 parts of xylene and 50 parts of Cellosolve acetate. This mixture is heated to 130° C. at which time the following mixture is added dropwise: 140 parts of styrene; 200 parts of hexylmethacrylate; 60 parts of glacial acrylic acid and 4 parts of ditertiary butyl peroxide. After this mixture is added, the temperature is held between 130° and 140° C. for 2.5 hours. Then 100 parts of amino-trimethylol-methane are added and the reactor equipped with a separator for reflux water. The mixture is heated at 140° C. until 21 parts of water are collected. The resin is then cooled and a paint composition prepared as in Example I. Upon testing this paint when dried, it is found to have excellent grease and detergent resistance.

*Example VIII*

Similar results are obtained when Example VII is repeated a number of times, replacing the hexyl methacrylate with equivalent amounts of dibutyl maleate, dioctyl fumarate, di-2-ethyl-hexyl itaconate, ethoxyethyl acrylate, butyl acrylate and octyl methacrylate, respectively.

*Example IX*

The procedure of Example I is repeated a number of times with good results when the acrylic acid used therein is replaced with an equivalent amount of maleic anhydride, fumaric acid, methacrylic acid, itaconic anhydride and tetrahydrophthalate anhydride, respectively.

*Example X*

The procedure of Example I is repeated four times with good results when the styrene used therein is replaced with an equivalent amount of vinyl naphthalene, and the acrylic acid is replaced with an equivalent amount of the monomethyl ester of maleic acid, the monoethyl ester of fumaric acid, the monobutyl ester of itaconic acid, and the monoamyl ester of tetrahydrophthalic acid, respectively.

*Example XI*

The procedure of Example X is repeated with good results using an equivalent amount of vinyl diphenyl in place of the vinyl naphthalene.

*Example XII*

The procedure of Example I is repeated a number of times with good results when the acrylic acid used there is replaced with an equivalent amount of the monoamids of maleic acid, fumaric acid, itaconic acid and tetrahydrophthalic acid, respectively.

The various polymeric products produced according to the above examples have repeating unit formulas which fit the corresponding formulas described above. For example, in Example I the styrene results in repeating unit formulas of the structure

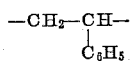

the repeating unit formula resulting from the 2-ethylhexyl acrylate has the repeating unit structure:

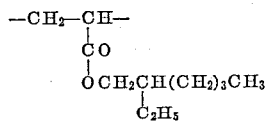

and the acrylic acid amide derivative has the repeating unit structure:

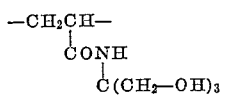

The structure of the amide repeating unit of Example II has the structure:

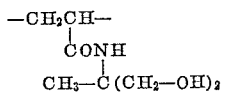

Likewise, the copolymers of Example VI have amide repeating unit structures respectively of the formulas:

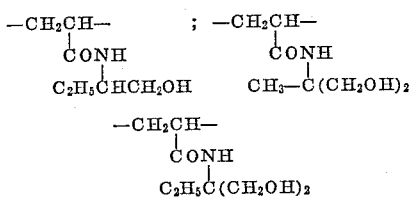

and

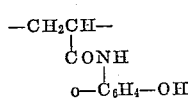

Because of the increased weight caused by amidification the percentage represented by these amide groups represent 1–20% of the total polymer, depending on the percentage of the original acid, the degree to which it is coverted to amide, and the size of the amide group.

The copolymers of this invention advantageously have molecular weights of at least 3,000, preferably at least 6,000 and up to 150,000 or even higher provided they retain their solubility at least until they are applied as coatings, etc.

In addition to the various repeating unit components described above, the copolymers of this invention can have various modifying comonomer repeating units derived by incorporating minor amounts, preferably less than 20% of modifying comonomers in the copolymerizable monomeric mixtures, provided such comonomers do not detract from the desired properties of the resultant copolymers. Typical of such modifying comonomers which can be used and generally to contribute desirable properties include, but are not restricted to, vinyl chloride, vinylidene chloride, acrylonitrile, acrylamide, vinyl acetate, etc. The resultant copolymers can also be modified by incorporating various fillers, pigments, dyes, inhibitors, antioxidants, driers, solvents, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:
1. The process for the preparation of a polymeric composition of improved flexibility comprising the steps of
Reacting a copolymer prepared by polymerizing by free radicals to a molecular weight of at least 3000, a monomeric composition comprising
(a) 20–85% by weight of a vinyl aromatic hydrocarbon,
(b) 1–15% by weight of an unsaturated acid selected from the class consisting of acrylic, methacrylic, maleic, fumaric, itaconic and tetrahydrophthalic acids and the monoamid and the alkyl monoester derivatives of maleic, fumaric, itaconic and tetrahydrophthalic acids, and
(c) 10–75% of an unsaturated ester selected from the class consisting of acrylates methacrylates, maleates, fumarates, itaconates and tetrahydrophthalates; the ester group in each of the aforesaid monesters and diesters being an alkyl group having no more than 10 carbon atoms therein, and in said acrylates and methacrylates, said alkyl ester group having at least 4 carbon atoms therein, and
under conditions suitable for removal of water of condensation resulting from amidification with an aminohydroxy compound having one amino group and at least one and no more than three hydroxy groups therein, said amino group having at least one hydrogen atom attached to the nitrogen, each said hydroxy group of said aminohydroxy compound being at least 2 carbon atoms removed from said amino group, said amino hydroxy compound having a hydrocarbon nucleus with no more than 10 carbon atoms therein and being selected from the class consisting of aliphatic, aromatic and cycloaliphatic hydrocarbons which have no substituent groups thereon other than said amino and said hydroxy groups, and said reaction being conducted until the proportion of amide groups attached by said reaction represents at least 1% by weight of the resultant copolymer but said reaction being stopped before water of condensation removed from the reaction substantially exceeds the theoretical amount for forming said amide.

2. The process of claim 1 in which said monomeric composition comprises 25–75% by weight of said vinyl aryl compound, 15–60% by weight of said unsaturated ester and 5–10% by weight of said unsaturated acid.

3. The process of claim 2 in which said amine group of said amino-hydroxy compound is a primary amine group.

4. The process of claim 3 in which said amino-hydroxy compound has at least 2 hydroxy groups therein.

5. The process of claim 4 in which the hydrocarbon portion of said amine-hydroxy compound is an aliphatic hydrocarbon group.

6. The process of claim 1 in which said vinyl aryl compound is styrene, said unsaturated acid is acrylic acid, and said unsaturated ester is an acrylate.

7. The process of claim 1 in which said vinyl aryl compound is styrene, said unsaturated acid is acrylic acid and said unsaturated ester is 2-ethylhexyl acrylate.

8. The process of claim 7 in which said amino-hydroxy compound is amino-trimethylol-methane.

9. The process of claim 1 in which said amino-hydroxy compound is amino-trimethylol-methane.

10. The process of claim 1 in which said amino-hydroxy compound is 2-amino-2-methylol-propanol-1.

11. A copolymer consisting essentially of:
(a) 20–85% by weight of a plurality of repeating units selected from the class consisting of the formula

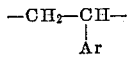

(b) 10-75% by weight of a plurality of repeating units having a formula selected from the class consisting of

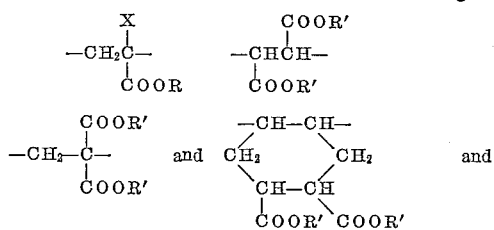

(c) 1-20% by weight of a plurality of repeating units having a formula selected from the class consisting of

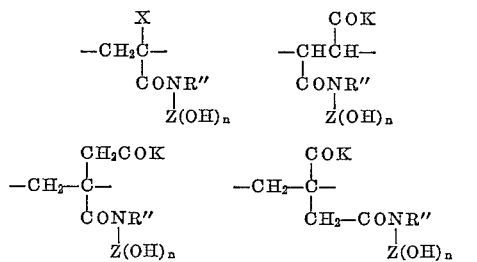

and

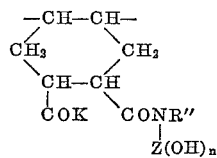

in which above formulas, Ar represents an aromatic hydrocarbon radical having no more than 20 carbon atoms, X is a radical selected from the class consisting of hydrogen and methyl, R is an alkyl group having no less than 4 and no more than 10 carbon atoms, R' is an alkyl group having no more than 10 carbon atoms, R" is a radical selected from the class consisting of hydrogen and alkyl groups having no more than 10 carbon atoms; $n$ is an integer having a value of at least 1 and no more than 3, and Z is a polyvalent radical selected from the class consisting of polyvalent aliphatic, cycloaliphatic and aromatic hydrocarbon radicals having no more than 10 carbon atoms therein and having a valency of $n$ plus 1 and having at least 2 carbon atoms between each OH group and the N of said formula, said copolymer being prepared by copolymerizing the monomeric composition recited in claim 1 and the product of said copolymerization being subsequently reacted to produce amidification in accordance with claim 1.

12. A copolymer consisting essentially of:
(a) 20-85% by weight of a plurality of repeating units having the formula

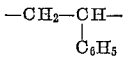

(b) 10-75% by weight of a plurality of repeating units having the formula

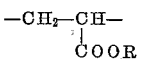

and
(c) 1-20% by weight of a plurality of repeating units having the formula

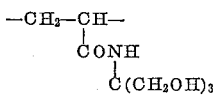

wherein R is an alkyl group having 4-10 carbon atoms therein.

13. A copolymer of claim 12 having 25-75 percent by weight of component (a), 15-60 percent by weight of component (b), and 5-10 percent by weight of component (c).

14. A copolymer of claim 13, in which component (b) has a repeating unit formula of

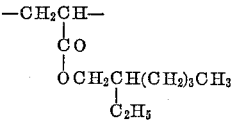

References Cited by the Examiner

UNITED STATES PATENTS

| | | | |
|---|---|---|---|
| 2,851,448 | 9/58 | Slocombe et al. | 260—78.5 |
| 2,897,182 | 7/59 | de Benneville et al. | 260—78.5 |
| 2,905,644 | 9/59 | Butter | 260—307.6 |
| 2,988,539 | 6/61 | Cohen et al. | 260—78.5 |

JOSEPH L. SCHOFER, *Primary Examiner.*

DONALD E. CZAJA, *Examiner.*